United States Patent Office 3,425,843
Patented Feb. 4, 1969

3,425,843
EDIBLE EMULSIONS CONTAINING
OLEAGINOUS GELS
Cornelis H. Japikse, Springfield Township, Hamilton County, Ohio, assignor to The Procter & Gamble Company, Cincinnati, Ohio, a corporation of Ohio
No Drawing. Filed Apr. 25, 1966, Ser. No. 544,696
U.S. Cl. 99—144        15 Claims
Int. Cl. A23l 1/24

ABSTRACT OF THE DISCLOSURE

An edible emulsion is made from about 10 to 70% by weight aqueous acidic solution having a pH ranging from about 2 to 6.5 and from about 30 to 90% by weight oleaginous gel having a stable beta-crystalline phase comprising from about 92 to 98% by weight of liquid glyceride oil having an iodine value of about 100 to 120 and about 2 to 8% by weight of solid tri-glyceride having an iodine value not exceeding about 12. The solid triglyceride consists essentially of a blend of (a) beta-phase-tending hardstock and (b) non-beta-phase-tending hardstock having a substantial portion of fatty acid groups having 20 to 24 carbon atoms. The proportion of (a) to (b) ranges from about 1:4 to about 4:1. The solid triglyceride has stable individual crystals up to about 10 microns and comprises at least about 1.2% by weight of the emulsion composition. At least 70% of the crystals are in the beta-phase.

---

This invention relates to stabilized emulsions which are particularly adaptable to the preparation of emulsified salad dressings. As used herein, the words "salad dressings" are intended to have a connotation broad enough to include at one extreme thick but pourable salad dressings such as French, Thousand-Island and certain cheese-flavored dresings, and at the other extreme spreadable salad dressings including mayonnaise.

The basic nature of emulsified salad dressings is well known. They consist of a liquid edible oil dispersed in an aqueous acidic ingredient such as vinegar or lemon juice. Various spices and minor additives are included for flavor and color. An additional required ingredient in salad dressings has been at least one component which serves to stabilize the system, i.e. prevent the aqueous and oleaginous components from separating.

In pourable emulsified salad dressings, the stabilizer generally is either an emulsifying agent such as egg yolk or a water binding agent such as one of a number of well known gums, or a mixture of these. In spreadable salad dressings, other than mayonnaise, these same stabilizers are commonly used; but, in addition, a cooked or partially cooked starch paste is added to provide additional firmness. Mayonnaise is distinguishable from the above salad dressings in that egg yolk is the sole stabilizer used. Starch paste is not required to obtain the necessary firmness. Mayonnaise is an emulsion of a relatively large amount of oil (generally 65% by weight minimum) in a relatively small amount of aqueous phase. This system has a firm, spreadable consistency by nature.

In preparing salad dressings, it customarily has been required to use an oil which remains substantially free of solid fats at all temperatures of use, including the temperatures generally encountered while under refrigeration. If a prior art salad dressing contained an oil in which solid fats would crystallize at any use temperature, it was found that serious stability problems were encountered, regardless of the type and amount of stabilizer present. The emulsions would break and the oleaginous and aqueous phases would separate.

The emulsion breakage apparently would occur during storage of the salad dressings at low temperatures which cause precipitation of solid fats. The phases would separate as the temperature of the salad dressing was allowed to raise. Accordingly, this problem has commonly been called "freeze-thaw failure," and resistance to this failure has been called "freeze-thaw stability." To obtain "freeze-thaw stability," it has been required to use a winterized oil in preparing salad dressings, which preferably included a crystal inhibitor such as oxystearin.

It is an object of this invention to provide a new and novel stable emulsion for use in preparing salad dressings, and to provide a method for its production.

It is another object of this invention to provide stable salad dressings which contain solid triglyceride particles.

The objects of this invention are achieved by providing an emulsion composition comprising from about 10% to about 70% by weight edible aqueous acidic solution and from about 30% to about 90% oleaginous gel having a stable beta crystalline phase comprising from 92% to about 98% by weight of liquid glyceride oil having an iodine value greater than about 75 and about 2% to 8% by weight of solid triglyceride having an iodine value not exceeding about 12, said solid triglyceride consisting essentially of a blend of (a) beta-phase-tending hardstock and (b) non-beta-phase-tending hardstock having a substantial portion of fatty acid groups having 20 to 24 carbon atoms, the proportion of (a) to (b) in said solid triglyceride blend ranging from about 1:4 to about 4:1, said solid triglyceride having stable individual crystal size up to about 10 microns and comprising at least about 1.2% by weight of the emulsion composition.

Emulsions with the above composition are advantageously used in preparing a variety of salad dressings without the need to add one or more of the conventional stabilizing agents. The stability of the salad dressings of this invention is directly traceable to the nature of the oleaginous material used in preparing the emulsions, referred to above and hereafter as an "oleaginous gel." These oleaginous gels are disclosed and claimed in co-pending application Ser. No. 544,695, filed concurrently herewith. The gels of the instant emulsions have somewhat more specific characteristics than those broadly defined in the co-pending application. The gels are oleaginous compositions which are characterized by the presence of small beta-phase triglyceride hardstock particles relatively uniformly dispersed in a liquid glyceride vehicle.

Oleaginous gels can be distinguished from conventional plastic oleaginous systems in that these conventional plastic systems obtain their physical stability from interconnecting bonds which form between the hard-stock particles, a physical network which entraps the liquid glycerides. In contrast, it is believed that oleaginous gels derive their stability from the existence of Van der Waals-London forces—the attractive forces which exist between the small and closely packed hardstock particles. These bonding forces are more easily broken than the conventional interconnecting bonds; however, unlike the conventional bonds, the Van der Waals-London bonds will re-establish after they have been broken by mechanical action if the oleaginous gel is allowed to remain at rest for a short period of time.

In contrast to the experience with prior art emulsified salad dressings wherein the presence of solid fats led to "freeze-thaw failure," the presence of the hardstock particles in the emulsions of this invention, used to prepare emulsified salad dressings, do not adversely affect the stability of the products. In fact, the presence of the hardstock particles has been found to stabilize the salad dressings and alleviate the need for additional stabilizers. While the exact reason for this unexpected stabilizing effect is not known, it is believed to be traceable to the above discussed Van der Waals bonds. These bonds apparently are sufficiently strong to keep the two phases from separating, and do not lose their efficacy at low temperatures, or even during freezing and thawing of the salad dressings.

An additional desirable and unexpected property imparted to salad dressings by the use of the emulsions disclosed herein is a relatively uniform consistency over a wide temperature range. This is particularly true when emulsions are used which contain a high percentage of oleaginous gel.

The hardstock particles of the oleaginous gel in the emulsions of this invention are predominantly in the beta crystalline phase. It is preferred that at least about 90% of the crystals be in the beta phase; however, acceptable properties in the emulsions are achieved when at least about 70% of the crystals are in beta phase.

To achieve the beta crystals with individual particle size of 10 microns or less necessary for the production of emulsions of this invention, the proportion of beta-tending and non-beta-tending solid triglycerides as defined above must be between about 1:4 and about 4:1 and preferably is between about 2:3 and about 3:2. Outside the above broad range the desirable reversible gel properties are not obtained in the oleaginous material. The desired beta crystals are obtained in process by rapidly chilling the mixture of the liquid glyceride and solid triglycerides, in the method described below.

The liquid glyceride component of the oleaginous gel composition for use in the emulsions of this invention can be any normally liquid glyceride oil or partially hydrogenated glyceride oil having an iodine value greater than about 75. Suitable glycerides can be obtained from animal, vegetable or marine sources, including naturally-occurring triglyceride oils and fats such as cottonseed oil, soybean oil, peanut oil, olive oil, palm oil, coconut oil, corn oil, rapeseed oil, sunflower seed oil, sardine oil, lard, tallow and the like materials containing a substantial proportion of fatty acid groups having from about 12 to about 24 carbon atoms. Mixtures of the above materials also can be used. A preferred range of iodine values is from about 100 to about 120 and a preferred oil is partially hydrogenated soybean oil.

Examples of beta-phase-tending hardstocks which can be used in the solid triglyceride component are tristearin, tripalmitin, and symmetrical palmitodistearin. Hard fats which have been subject to molecular rearrangement and hydrogenation processes whereby a major amount of tristearin or tripalmitin, for example, is caused to be present in the rearranged product can also be used. Other suitable triglyceride hardstocks having strong beta-phase tendencies can be derived from substantially completely hydrogenated fats and oils such as lard, sunflower seed oil, safflower seed oil, linseed oil, sesame seed oil, hazelnut oil, soybean oil, peanut oil, olive oil, corn oil, and other fats and oils having a substantial proportion of fatty acid groups having at least 8 carbon atoms in the molecule. The preferred beta-phase-tending hardstock is substantially completely hydrogenated soybean oil having an iodine value of about 8.

The preferred non-beta-phase-tending hardstock component of the triglyceride solids blend is substantially completely hydrogenated rapeseed oil having an iodine value of about 8. This material tends to crystallize in the beta-prime phase and is known to hinder the formation of beta-phase crystals in conventional shortenings. However, it has been found that substantially completely hydrogenated rapeseed oil in combination with beta-phase-tending hardstock in the aforesaid proportions can be processed to form beta-phase oleaginous gels. Other non-beta-phase-tending hardstocks which can be used in preparing the emulsions of this invention are substantially completely hydrogenated fats and oils having a substantial proportion of fatty acid groups having 20 to 24 carbon atoms such as mustard seed oil, crambe oil and fish oils such as salmon, herring, pilchard, whale, menhaden and sardine oils.

The minimum amount of the above-described blend of solid triglyceride which can be used in the oleaginous gel for preparation of the emulsions disclosed herein is about 2% by weight of the gel, or about 1.2% by weight of the emulsion composition, whichever is higher. Below this level the emulsion may start to lose its stability at higher temperatures, such as about 90° F. The maximum amount of solid triglyceride which can be used is 8% by weight of the gel, for if this hardstock level is exceeded, a waxy impression when eaten will be noticeable in the salad dressings which are prepared from these emulsions. The preferred range of usage of the solid triglyceride is from about 5% to 7% by weight of the gel.

The aqueous phase for use in the emulsions of this invention can be any of the edible aqueous acidic solutions commonly used in the preparation of salad dressings, the most common of which are aqueous acetic acid solutions and aqueous citric acid solutions and mixtures thereof. The preferred aqueous acidic solutions are vinegar, lemon juice and lime juice, either in their natural state, or in concentrated or diluted form. While the amount of acidic material in the solution can vary to suit individual taste, an amount of acidic mtaerial should be present which is sufficient to give the acidic solution a pH of from about 2 to about 6.5.

The balance between the proportions of oleaginous gel and aqueous acidic solution varies with the intended use of the emulsion. When pourable salad dressings or salad dressings which are to be thickened with a starch paste are to be prepared from the emulsion, the weight ratio of aqueous acidic solution to oleaginous gel can be as high as about 70:30. When mayonnaise is to be prepared, the weight ratio of aqueous acidic solution to oleaginous gel can be as low as about 10:90. The preferred emulsions of this invention are those which contain from about 10% to about 50% by weight aqueous acidic solution and from about 50% to about 90% by weight oleaginous gel.

When the above-described emulsion systems are used to prepare salad dressings, any of the conventional ingredients used for such purposes may be added. While not necessary, emulsifiers or water-binding agents commonly used in the prior art can be added. Typical examples of emulsifiers which have been used in the past are mono- and diglycerides of higher fatty acids, lecithin and egg yolks. Typical water-binding agents which have been used in the past in salad dressings are starch, gum arabic, locust bean gum and carboxymethylcellulose. Of the above emulsifiers, egg yolk is the preferred additive for use with the emulsions disclosed herein for the preparation of salad dressings. In addition to its above-noted stabilizing ability, egg yolks also lend to salad dressings a texture and flavor which has come to be expected by many consumers. The egg yolk added can be fresh or frozen egg yolk, or in the form of whole eggs. The egg yolks can constitute up to about 20% by weight of the salad dressing. Other emulsifiers can constitute up to about 2% by weight of the salad dressing. When a water-binding agent is used, it can constitute up to about 40% by weight of the salad dressing.

The salad dressings prepared from the emulsions of this invention also preferably contain flavoring ingredients such as salt, sucrose, dextrose, spices such as mustard and paprika, tomato paste, or other tomato derivatives, and natural or artificial flavors. Food coloring may be added if desired. The sucrose can constitute up to about 12% by weight of the salad dressing. While the other flavor ingredients and food coloring can be added to suit individual taste, they should not exceed about 10% by weight of the salad dressing, and it is preferred that they comprise from about 1% to about 7% by weight of the salad dressing composition.

can be prepared from the emulsions of this invention are

Typical examples of preferred salad dressings which listed in the following table. The parenthetical figure following the oleaginous gel content indicates the content of the hardstock mixture in the oleaginous gel, expressed as percent by weight of the oleaginous gel.

| Ingredient | Mayonnaise, approx. percent by weight | Non-mayonnaise spreadable dressing, approx. percent by weight | Pourable dressing, approx. percent by weight |
| --- | --- | --- | --- |
| Emulsion of this invention: | | | |
| Oleaginous gel | 70-82(5-8) | 40-50(5-8) | 35-50(2-5) |
| Aqueous acidic solution | 9-12 | 35-50 | 40-55 |
| Egg yolks | 5-20 | 3-7 | 0-4 |
| Sucrose | 5-10 | 5-10 | 3-10 |
| Spices, food color and other minor ingredients | 0-2 | 0-2 | 0-2 |

In preparing the emulsions of this invention the critical factor is proper handling of the oleaginous materials. To obtain the necessary beta-phase crystalline structure the mixture of liquid glyceride and solid triglyceride materials is heated to a temperature at which the normally solid components are in the liquid state, generally about 130° F. or above. Then the triglyceride hardstock particles are recrystallized by rapidly chilling the mixture to less than about 85° F. in less than about 60 seconds. The solid triglycerides in the above mixture crystallize in-process in the beta-crystalline state. This is in contrast to the normal process of preparing beta-crystalline oils and shortenings which involves either (a) crystallization of the hardstock in the beta-prime phase followed by tempering, generally at temperatures of about 100° F. to about 120° F. for a number of hours or even a number of days, to allow the beta-prime crystals to change to beta-crystals, or (b) slowly cooling (e.g., about four hours or longer) a mixture of normally solid triglyceride in liquid glyceride to form beta crystals.

The preferred method of preparation for the emulsions disclosed herein comprises mixing and heating edible aqueous acidic solution and oleaginous ingredients, the oleaginous ingredients comprising liquid glyceride oil and a blend of melted triglyceride solids, the amount and nature of all ingredients being defined above; and then rapidly chilling the mixture to less than about 85° F. (preferably between about 40° F. and about 60° F.) in less than about 60 seconds (preferably less than 45 seconds) to form an emulsion composition containing triglyceride solids having a stable beta crystalline phase with an individual particle size up to about 10 microns.

The mixing step can be performed in any appropriately-sized high speed mixer, such as a turbine agitated tank.

The rapid chilling can be conducted in a freezer such as a scraped wall heat exchanger. A suitable device for this purpose, referred to as a "Votator," is described by Vogt, U.S. Reissue Patent 21,406, granted Mar. 19, 1940.

As an alternate method of preparation for the emulsions of this invention, the oleaginous gel is formed first by melting the oleaginous ingredients and rapidly chilling them as described above. After the chilling step, the edible aqueous acidic solution is added and mixed into the oleaginous gel, as by the use of a conventional mixer, such as a Hobart C-100 mixer or equivalent, to prepare the emulsions of this invention.

When the emulsions of this invention are used to prepare salad dressings, other selected ingredients can be added to the emulsion and thoroughly blended, as by the use of the conventional mixers described above. However, in the preferred operation, they are added during the preparation of the emulsion. This can be done conveniently by mixing the selected ingredients with at least a portion of the edible aqueous acidic solution, and then blending this mixture with the oleaginous gel. This procedure is fully demonstrated in Example III, below.

The following examples are given to demonstrate the preparation of the emulsions of the invention disclosed herein. These examples are not intended to be limitations upon the invention. Unless indicated otherwise all ratios and percentages are by weight.

EXAMPLE I

Two hundred pounds of each of two different oleaginous gels were prepared in the following manner. For each gel, the ingredients were melted in a turbine agitated steel tank and heated to 150° F. under gentle agitation. The mixture was then rapidly cooled to 60° F. in less than about 20 seconds. Each gel was composed of a normally liquid glyceride oil (refined and bleached soybean oil, hydrogenated to iodine value 107), and a 50-50 mixture (weight basis) of a combination of triglyceride hardstocks (refined, bleached and hardened soybean oil and rapeseed oil, each hydrogenated to iodine value 8). The gels differed only in the percent of hardstock present. Oleaginous gel A contained 2.5% of the hardstock mixture and 97.5% glyceride oil, and oleaginous gel B contained 8% of the hardstock mixture and 92% glyceride oil. The hardstock particles in each gel were in excess of 95% in the beta phase and had individual particle sizes of up to about 10 microns.

Using these oleaginous gels, four emulsions were prepared by mixing the ingredients for each of the two-quart bowl at high speed with a Sunbeam household mixer until a uniform emulsion was obtained. The compositions were as follows, all figures expressed as percent by weight:

|  | I | II | III | IV |
| --- | --- | --- | --- | --- |
| Oleaginous gel "A" | 50 | 90 | | |
| Oleaginous gel "B" | | | 30 | 90 |
| Vinegar | 50 | 10 | 70 | 10 |

Each of the above emulsions was stable against separation of the aqueous and oleaginous phases and was useful in the preparation of pourable and/or spreadable salad dressings.

When in the above example the liquid soybean oil is replaced in whole or in part by cottonseed oil, peanut oil, olive oil, palm oil, coconut oil, corn oil, rapeseed oil, sunflower seed oil, sardine oil, lard, tallow and mixtures thereof, each having an iodine value of greater than 75; and/or the soybean hardstock is replaced in whole or in part by substantially completely hydrogenated lard, sunflower seed oil, hazelnut oil, peanut oil, olive oil, corn oil and mixtures thereof, each having an iodine value of less than 12; and/or the rapeseed hardstock is replaced in whole or in part by substantially completely hydrogenated mustard seed oil, crambe oil, salmon oil, herring oil, pilchard oil, whale oil, menhaden oil, sardine oil and mixtures thereof, each having an iodine value of less than 12; substantially similar results are obtained in that oleaginous gels containing predominantly beta phase hardstock particles with individual particle size of up to about 10 microns are produced which have uutility in preparing the emulsions of this invention.

Further, when in the above example, the hardstock mixtures are replaced by hardstock mixtures in which the weight ratio of soybean to rapeseed hardstock is 1:4 and 4:1, substantially similar results are obtained in that oleaginous gels containing predominantly beta-phase hardstock particles with individual particle size of up to about 10 microns are produced which have utility in preparing the emulsions of this invention.

Further, when emulsions having the same compositions as the emulsions prepared in the above example are prepared by mixing the oleaginous ingredients and the vinegar in the mixing tank, heating the mixture to melt the triglyceride solids and then rapidly chilling the mixture to less than 85° F. in less than 60 seconds, substantially similar results are obtained in that stable emulsions are produced which contain predominantly beta-phase hardstock crystals having an individual particle size of up to about 10 microns.

EXAMPLE II

Oleaginous gels C and D were prepared by the same method as described in Example I. Both gels contained a total of 5% by weight hardstock blend. In gel C the weight ratio of soybean hardstock to rapeseed hardstock was 60:40. In gel D the weight ratio of soybean hardstock to rapeseed hardstock was 40:60. The hardstock particles in each gel were in excess of 95% in the beta phase and had individual particle sizes of up to about 10 microns.

Each of gels A and B from Example I and gels C and D of this example were used to prepare salad dressings having the following formula:

| | Parts by weight |
|---|---|
| Oleaginous gel | 79 |
| Vinegar | 10 |
| Sucrose | 10 |
| Spice, flavor and coloring | 1 |

The salad dressings were prepared by mixing the ingredients in a Hobart C–100 mixer at #3 speed until a uniform emulsion was obtained.

Samples of each salad dressing were stored at 40° F., 70° F. and 100° F. for 24 hours and then inspected. The salad dressing prepared from oleaginous gel A (2.5% hardstock) was viscous but easily pourable at all storage temperatures. The salad dressing prepared from oleaginous gel B (8% hardstock) had a spreadable consistency at all storage temperatures, much like conventional mayonnaise at room temperature. The salad dressings prepared from oleaginous gels C and D (5% hardstock) were pourable and had a viscosity which was intermediate between the viscosities of the salad dressings prepared from gels A and B. Each of the salad dressings prepared from gels A, B, C and D had an acceptable flavor and texture for use in applications where various salad dressings are customarily used.

EXAMPLE III

A portion of oleaginous gel A from Example I was used to prepare a mayonnaise composition in the following manner. To a Sunbeam household mixer were added the following ingredients, expressed in parts by weight:

| | Parts |
|---|---|
| Egg yolks | 16 |
| Dry mustard | 1 |
| Sucrose | 1.5 |
| Salt | 0.5 |
| Lemon juice | 5 |

After rapidly mixing the above ingredients to obtain a uniform mixture, the speed was reduced to medium speed and 71 parts by weight of the oleaginous gel were added. Thereafter an additional 5 parts by weight of lemon juice were added and the mixing speed returned to high speed. Mixing was continued until a uniform emulsion was obtained.

The above procedure was repeated to prepare a second mayonnaise, substituting oleaginous gel B for oleaginous gel A.

Each of the mayonnaise compositions had acceptable flavor and texture for use in sandwiches, salads and in other applications where mayonnaise is commonly used.

EXAMPLE IV

The freeze-thaw stability of the salad dressings prepared from oleaginous gels A and B prepared in Example II was compared to the freeze-thaw stability of (a) a leading commercial mayonnaise and (b) a leading commercial starch-stabilized spreadable salad dressing. In this test, multiple samples of each product were placed in 8-dram vials and three samples of each were stored at each of temperatures −20° F., 0° F. and 20° F. After 24 hours one sample was allowed to return to room temperature and any separation of phases was noted. The second and third samples were removed and inspected after three and seven days respectively.

Each sample of the two commercial products which had been stored at the indicated temperatures for three or seven days experienced freeze-thaw failure as shown by the separation of the aqueous and oleaginous phases. Each sample of the salad dressings prepared from oleaginous gels A and B in Example II, above, remained stable as shown by the absence of separation of phases over the entire period of testing.

What is claimed is:

1. An edible emulsion composition which comprises from about 10% to about 70% by weight edible aqueous acidic solution having a pH of about 2 to 6.5 and from about 30% to about 90% by weight oleaginous gel having a stable beta-crystalline phase comprising from 92% to about 98% by weight of liquid glyceride oil having an iodine value of about 100 to 120 and about 2% to 8% by weight of solid triglyceride having an iodine value not exceeding about 12, said solid triglyceride consisting essentially of a blend of (a) beta-phase-tending hardstock and (b) non-beta-phase-tending hardstock having a substantial portion of fatty acid groups having 20 to 24 carbon atoms, the proportion of (a) to (b) in said solid triglyceride blend ranging from about 1:4 to about 4:1, said solid triglyceride having stable individual crystal size up to about 10 microns and comprising at least about 1.2% by weight of the emulsion composition and being at least 70% in the beta-phase.

2. The composition of claim 1 in which the edible aqueous acidic solution is selected from the group consisting of aqueous acetic acid and aqueous citric acid solutions.

3. The composition of claim 1 in which the edible aqueous acidic solution is selected from the group consisting of vinegar, lemon juice and lime juice.

4. The composition of claim 1 wherein the liquid glyceride oil is selected from the group consisting of soybean oil, peanut oil, and cottonseed oil.

5. The composition of claim 1 in which the beta-phase-tending hardstock is substantially completely hydrogenated soybean oil.

6. The composition of claim 1 in which the non-beta-phase-tending hardstock is substantially completely hydrogenated rapeseed oil.

6. The composition of claim 1 which contains from about 10% to about 50% by weight edible aqueous acidic solution and from about 50% to about 90% by weight oleaginous gel.

8. The composition of claim 1 which contains egg yolk as an additional ingredient, the egg yolk comprising about 3 to 20% by weight of the total composition.

9. The composition of claim 1 which contains sucrose as an additional ingredient, the sucrose comprising about 3 to 12% by weight of the total composition.

10. The method of preparing an edible emulsion composition which comprises mixing and heating from about 10% to about 70% by weight edible aqueous acidic solution having a pH of about 2 to 6.5 and from about 30% to about 90% by weight of oleaginous ingredients, the oleaginous ingredients comprising from 92% to about 98% by weight of liquid glyceride oil having an iodine value of about 100 to 120 and from about 2% to 8% by weight of melted triglyceride solids consisting essentially of a blend of (a) beta-phase-tending hardstock and (b) non-beta-phase-tending hardstock having a substantial portion of fatty acid groups having 20 to 24 carbon atoms, the weight proportion of (a) to (b) in said solid triglyceride blend ranging from about 1:4 to about 4:1, the blend of triglyceride solid comprising at least about 1.2% by weight of the mixture, and then rapidly chilling the mixture to less than about 85° F. in less than about 60 seconds to form an emulsion composition containing triglyceride solids having a stable beta-crystalline phase with an individual particle size of about up to 10 microns and being at least 70% in the beta-phase.

11. The method of claim 10 in which the mixture is rapidly chilled to between about 40° F. and about 60° F.

12. The method of claim 10 in which the rapid chilling is conducted in less than about 45 seconds.

13. The method of claim 10 in which the liquid glyceride oil is selected from the group consisting of soybean oil, peanut oil, and cottonseed oil.

14. The method of claim 10 in which the beta-phase-tending hardstock is substantially completely hydrogenated soybean oil.

15. The method of claim 10 in which the non-beta-phase tending hardstock is substantially completely hydrogenated rapeseed oil.

References Cited

UNITED STATES PATENTS

| | | | |
|---|---|---|---|
| 2,131,064 | 9/1938 | Musher | 99—114 |
| 3,253,937 | 5/1966 | Going et al. | 99—118 |

MAURICE W. GREENSTEIN, *Primary Examiner.*